(12) United States Patent
Yokota et al.

(10) Patent No.: US 10,181,921 B2
(45) Date of Patent: Jan. 15, 2019

(54) FRAMER AND FRAMING METHOD

(71) Applicant: NIPPON TELEGRAPH AND TELEPHONE CORPORATION, Tokyo (JP)

(72) Inventors: Masahiro Yokota, Tokyo (JP); Takafumi Hamano, Tokyo (JP); Takashi Kotanigawa, Tokyo (JP); Kaoru Arai, Tokyo (JP); Kei Kitamura, Tokyo (JP); Hideki Maeda, Tokyo (JP); Yoshiaki Yamada, Yokosuka (JP); Takuya Ohara, Yokosuka (JP); Kengo Shintaku, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/527,274

(22) PCT Filed: Nov. 26, 2015

(86) PCT No.: PCT/JP2015/083237
§ 371 (c)(1),
(2) Date: May 16, 2017

(87) PCT Pub. No.: WO2016/084897
PCT Pub. Date: Jun. 2, 2016

(65) Prior Publication Data
US 2017/0366288 A1     Dec. 21, 2017

(30) Foreign Application Priority Data
Nov. 28, 2014  (JP) ................................. 2014-241577

(51) Int. Cl.
*H04J 3/16* (2006.01)
*H04J 14/08* (2006.01)
(Continued)

(52) U.S. Cl.
CPC ............ *H04J 3/1652* (2013.01); *H04B 10/03* (2013.01); *H04J 3/14* (2013.01); *H04J 14/00* (2013.01);
(Continued)

(58) Field of Classification Search
CPC ......... H04J 3/1652; H04J 14/08; H04L 47/34; H04L 49/552
See application file for complete search history.

(56) References Cited

U.S. PATENT DOCUMENTS

2010/0142947 A1   6/2010  Shin et al.
2013/0216217 A1*  8/2013  Sharma .................... H04J 14/08
                                                 398/8

FOREIGN PATENT DOCUMENTS

CN      103533464 A       1/2014
EP       2819362 A1 *    12/2014  ............ H04J 3/1652
(Continued)

OTHER PUBLICATIONS

"Interfaces for the optical transport network", ITU-T G.709/Y.1331, Feb. 2012.
(Continued)

*Primary Examiner* — Mina Shalaby
(74) *Attorney, Agent, or Firm* — Harness, Dickey & Pierce, P.L.C.

(57) ABSTRACT

A framer in a transmission device that allocates time slots of an optical channel to a logical path, divides client signals received via the logical path to the time slots allocated to the logical path, and transmits the client signals by a plurality of optical subcarriers using optical wavelengths correlated with the time slots includes: a time slot allocating unit configured to perform a process of reducing a transmission band of the logical path when some of the optical wavelengths are unavailable and changing the time slots allocated to the
(Continued)

logical path depending on the reduced transmission band to avoid using the time slots corresponding to the unavailable optical wavelengths.

8 Claims, 11 Drawing Sheets

(51) Int. Cl.
    *H04L 12/801* (2013.01)
    *H04L 12/939* (2013.01)
    *H04B 10/03* (2013.01)
    *H04J 3/14* (2006.01)
    *H04J 14/00* (2006.01)
    *H04J 14/02* (2006.01)

(52) U.S. Cl.
    CPC .............. *H04J 14/02* (2013.01); *H04J 14/08* (2013.01); *H04L 47/34* (2013.01); *H04L 49/552* (2013.01)

(56) References Cited

FOREIGN PATENT DOCUMENTS

| | | |
|---|---|---|
| EP | 2819362 A1 | 12/2014 |
| JP | 2010-136380 A | 6/2010 |
| JP | 2012-004839 A | 1/2012 |
| JP | 2012004839 A * | 1/2012 |
| WO | WO-2013/125621 A1 | 8/2013 |

OTHER PUBLICATIONS

T. Ohara "OTN Interface Technologies and Standardization Trend", IEICE 2014, Mar. 2014, BI-5-1, SS-47 to SS-48, with partial translation thereof.

International Search Report for PCT/JP2015/083237, ISA/JP, Tokyo, dated Jan. 26, 2016.

Bo Wen et al.: "Routing, wavelength and time-slot-assignment algorithms for wavelength-routed optical WDM/TDM networks", Journal of Lightwave Technology, vol. 23, No. 9, Sep. 1, 2005 (Sep. 1, 2005), pp. 2598-2609.

Extended European Search Report issued in parallel application EP 15863549.0, EPO/Munich, dated Feb. 23, 2018.

\* cited by examiner

TRANSMISSION FRAME

| 1  |  |  |  |  |  |  |  |  | 10 | → OPTICAL WAVELENGTH #1 |
| 11 |  |  |  |  |  |  |  |  | 20 | → OPTICAL WAVELENGTH #2 |
| 21 |  |  |  |  |  |  |  |  | 30 | → OPTICAL WAVELENGTH #3 |
| 31 |  |  |  |  |  |  |  |  | 40 | → OPTICAL WAVELENGTH #4 |
| 41 |  |  |  |  |  |  |  |  | 50 | → OPTICAL WAVELENGTH #5 |

FIG. 8

| LOGICAL PATH ID | TRANSMISSION BAND | ALLOCATED TIME SLOT ID |
|---|---|---|
| LOGICAL PATH #1 | 50Gbps | 1~5 |
| LOGICAL PATH #2 | 50Gbps | 6~10 |
| LOGICAL PATH #3 | 200Gbps | 11~30 |
| LOGICAL PATH #4 | 100Gbps | 31~40 |
| LOGICAL PATH #5 | 100Gbps | 41~50 |

FIG. 9

| ABNORMAL TIME SLOT LIST |
|---|
| 21, 22, ..., 29, 30 |

FIG. 10

| ABNORMAL LOGICAL PATH ID LIST |
|---|
| #3 |

FIG. 15

TIME SLOT ALLOCATION MANAGEMENT TABLE

| LOGICAL PATH ID | PRIORITY | TRANSMISSION BAND | ALLOCATED TIME SLOT ID |
|---|---|---|---|
| LOGICAL PATH #1 | HIGH | 50Gbps | 1~5 |
| LOGICAL PATH #2 | LOW | 90Gbps | 8~10, 15~20 |
| LOGICAL PATH #3 | HIGH | 100Gbps | 13~14, 23~30 |
| LOGICAL PATH #4 | LOW | 60Gbps | 35~40 |
| LOGICAL PATH #5 | HIGH | 100Gbps | 31~32, 41~48 |

TIME SLOT ALLOCATION MANAGEMENT TABLE

| LOGICAL PATH ID | PRIORITY | TRANSMISSION BAND | ALLOCATED TIME SLOT ID |
|---|---|---|---|
| LOGICAL PATH #1 | HIGH | 50Gbps | 1~5 |
| LOGICAL PATH #2 | LOW | 40Gbps | 8~10, 20 |
| LOGICAL PATH #3 | HIGH | 100Gbps | 13~19, 35~37 |
| LOGICAL PATH #4 | LOW | 30Gbps | 38~40 |
| LOGICAL PATH #5 | HIGH | 100Gbps | 31~32, 41~48 |

FRAMER AND FRAMING METHOD

CROSS-REFERENCE TO RELATED APPLICATIONS

This application is a 371 U.S. National Stage of International Application No. PCT/JP2015/083237, filed on Nov. 26, 2015, which claims the benefit of and priority to Japanese Patent Application No. 2014-241577, filed on Nov. 28, 2014. The disclosures of both of the above applications are incorporated herein by reference.

TECHNICAL FIELD

The present invention relates to a framer and a framing method.

BACKGROUND ART

In an optical transport network (OTN) which is a wide-area optical transport network with a large capacity, client signals based on various standards such as synchronous digital hierarchy (SDH) and Ethernet (registered trademark) are accommodated and transmitted.

In recent years, traffic of client signals has increased remarkably and thus OTNs have been standardized to cope with an increase in speed (for example, see Non-Patent Document 1). At present, optical channel transport unit-Cn (OTUCn) (where Cn denotes 100G×n) which is an OTN technique over 100G (B100G, where G is gigabits per second) is being studied (for example, see Non-Patent Document 2).

In OTUCn, a transmission capacity of one optical channel is a frequency band broader than that in the conventional OTU. However, it is difficult to achieve an increase in capacity by extending single carrier transmission in a frequency band of one optical channel as before due to a relationship with an operating speed of an electronic circuit which is used for an optical signal transceiver. Therefore, in OTUCn, an increase in capacity is realized by multicarrier transmission using a plurality of optical subcarriers in the frequency band of one optical channel.

DOCUMENTS OF THE PRIOR ART

Non-Patent Document

[Non-Patent Document 1]
"Interfaces for the optical transport network," ITU-T G.709/Y.1331, February 2012
[Non-Patent Document 2]
"OTN Interface Technologies and Standardization Trend," Communication Lecture Papers 2, 2014 Comprehensive Meeting of the Institute of Electronics, Information, and Communication Engineers, BI-5-1, SS-47-SS-48, March, 2014

SUMMARY OF INVENTION

Problem to be Solved by the Invention

A framer which is used in OTUCn multiplexes and sets a plurality of client signals to one ODUCn (ODU: Optical Channel Data Unit). The framer generates an electrical signal of optical channel transport unit-Cn (OTUCn) with a payload capacity of n×100G from ODUCn in which the client signals are set. The framer interleaves the generated electrical signal of OTUCn and generates n optical channel transport lane-Cn.n (OTLCn.n) which are parallel signals with a payload capacity of 100G.

The n parallel signals corresponding to one optical channel which are generated by the framer are multicarrier-transmitted by optical subcarriers using a plurality of optical wavelengths. When an optical wavelength is unavailable such as when abnormality occurs in a part of the plurality of optical wavelengths, there is a possibility that even traffic of a client signal using the optical wavelength in only partial transmission will be cut fully off.

In consideration of the above-mentioned circumstances, an object of the present invention is to provide a framer and a framing method that can decrease an influence of abnormality of some optical wavelengths or the like to transmission of client signals when a plurality of client signals are multicarrier-transmitted using a plurality of parallel signals.

Means for Solving the Problems

According to an aspect of the present invention, there is provided a framer in a transmission device that allocates time slots of an optical channel to a logical path, divides client signals received via the logical path to the time slots allocated to the logical path, and transmits the client signals by a plurality of optical subcarriers using optical wavelengths correlated with the time slots, the framer including: a time slot allocating unit configured to perform a process of reducing a transmission band of the logical path when some of the optical wavelengths are unavailable and changing the time slots allocated to the logical path depending on the reduced transmission band to avoid using the time slots corresponding to the unavailable optical wavelengths.

The framer according to the present invention may further include a band limiting instructing unit configured to instruct a device transmitting the client signals using the logical path of which the transmission band is reduced by the time slot allocating unit to reduce an available transmission band.

In the framer according to the present invention, the time slot allocating unit may reduce the transmission band of the logical path allocated to the time slots corresponding to the unavailable optical wavelengths.

In the framer according to the present invention, the time slot allocating unit may reduce the transmission band of the logical path having a lower priority than the logical path allocated to the time slots corresponding to the unavailable optical wavelengths.

According to an aspect of the present invention, there is provided a framing method which is performed by a framer in a transmission device that allocates time slots of an optical channel to a logical path, divides client signals received via the logical path to the time slots allocated to the logical path, and transmits the client signals by a plurality of optical subcarriers using optical wavelengths correlated with the time slots, the framing method including: a time slot allocating step of performing a process of reducing a transmission band of the logical path when some of the optical wavelengths are unavailable and changing the time slots allocated to the logical path depending on the reduced transmission band to avoid using the time slots corresponding to the unavailable optical wavelengths.

The framing method according to the present invention may further include a band limiting instructing step of instructing a device transmitting the client signals using the logical path of which the transmission band is reduced in the time slot allocating step to reduce an available transmission band.

In the framing method according to the present invention, the time slot allocating step may include reducing the transmission band of the logical path allocated to the time slots corresponding to the unavailable optical wavelengths.

In the framing method according to the present invention, the time slot allocating step may include reducing the transmission band of the logical path having a lower priority than the logical path allocated to the time slots corresponding to the unavailable optical wavelengths.

Advantageous Effects of the Invention

According to the present invention, it is possible to decrease an influence of abnormality of some optical wavelengths or the like to transmission of client signals when a plurality of client signals are multicarrier-transmitted using a plurality of parallel signals.

BRIEF DESCRIPTION OF DRAWINGS

FIG. 8 is a diagram illustrating a table structure of a time slot allocation management table according to the embodiment.

FIG. 9 is a diagram illustrating an abnormal time slot list which is received by an abnormality information receiving unit illustrated in FIG. 6.

FIG. 10 is a diagram illustrating a configuration of an abnormal logical path ID list which is generated by a list generating unit illustrated in FIG. 6.

FIG. 15 is a diagram illustrating another example of a process of mapping logical path traffic on time slots according to the embodiment.

EMBODIMENTS FOR CARRYING OUT THE INVENTION

Hereinafter, embodiments of the present invention will be described with reference to the accompanying drawings.

Figure 1:
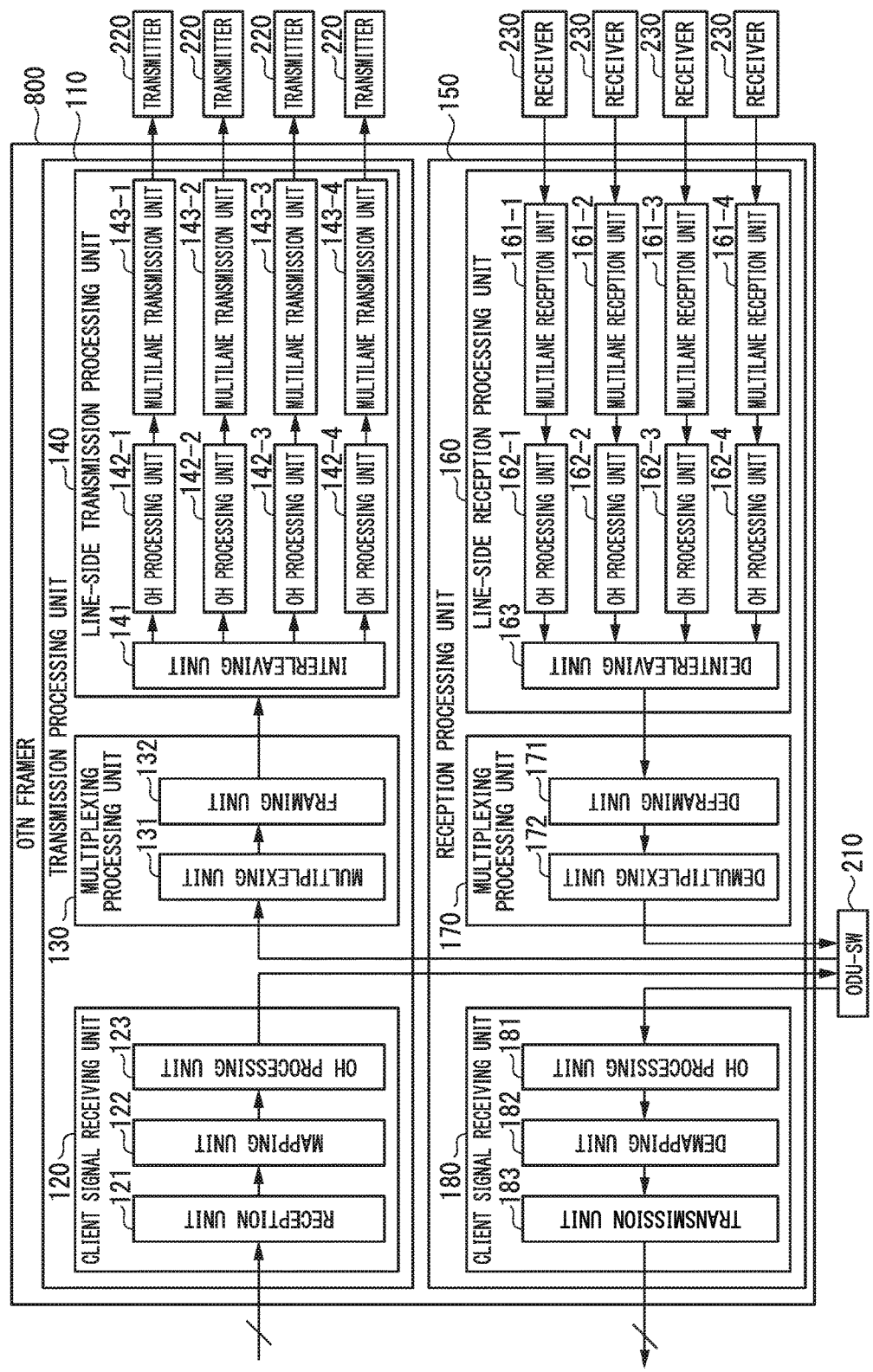
FIG. 1 is a block diagram illustrating a framer according to an embodiment of the present invention.

FIG. 1 is a functional block diagram illustrating an OTN framer 800 according to an embodiment of the present invention. The OTN framer 800 illustrated in the drawing represents an OTUCn (where Cn denotes 100G×n) which is an optical transport network (OTN) standard for transmission over 100G (B100G, where G denotes gigabits per second and n is an integer greater than 2). In the drawing, a case of n=4, that is, a case in which the OTN framer 800 performs communication using OTUC4, is illustrated.

In the OTN transport technique, client signals based on various communication schemes are accommodated and transmitted by optical transmission. In the OTN, a fixed frame structure is used and client signals are handled in units of tributary slots (TS which is also referred to as time slots) of 1.25G (that is, a multiple thereof) using ODU0 (ODU: Optical Channel Data Unit) which is a minimum unit capable of accommodating GbE (Gigabit Ethernet (registered trademark)). OTN provides the same path management, the same OAM (Operations, Administration. Maintenance) function, and the same protection function as in synchronous digital hierarchy (SDH).

The OTN framer 800 separates a signal of one optical channel of n×100G obtained by multiplexing a plurality of client signals and generates n parallel signals of 100G. Then parallel signals are multi-carrier transmitted by a plurality of optical subcarriers but, physically, one parallel signal may be transmitted by one optical subcarrier or a plurality of parallel signals may be transmitted by one optical subcarrier.

Multicarrier transmission is a communication scheme of increasing the capacity of one channel by transmitting a signal of one channel using a plurality of subcarriers (carrier waves). In the multicarrier transmission, subcarriers are multiplexed in a high density and are electrically separated for each ground (destination). When one parallel signal is transmitted by one optical subcarrier, the band of the optical subcarrier is 100G When two parallel signals are transmitted by one optical subcarrier, the band of the optical subcarrier is 200G. In the optical transmission, a modulation scheme such as 4SC-DP-QPSK (4 Subcarrier-Dual Polarization-Quadrature Phase Shift Keying) or 2SC-DP-16QAM (2 Subcarrier-Dual Polarization-Quadrature Amplitude Modulation) is used.

As illustrated in FIG. 1, the OTN framer 800 includes a transmission processing unit 110 and a reception processing unit 150.

The transmission processing unit 110 includes a client signal receiving unit 120, a multiplexing processing unit 130, and a line-side transmission processing unit 140.

The client signal receiving unit 120 includes a reception unit 121, a mapping unit 122, and an OH processing unit 123.

The reception unit 121 receives a client signal. The mapping unit 122 maps the client signal received by the reception unit 121 on a payload of a lower order optical channel data unit (LO ODU) frame. The OH processing unit 123 adds overheads (OH) to the LO ODU frame in which the client signal is set by the mapping unit 122. The OH processing unit 123 outputs an electrical path signal of the LO ODU frame to an ODU switch (hereinafter referred to as "ODU-SW") 210. The ODU-SW 210 is connected to another OTN framer 800 and performs path exchange of the electrical path signal.

The multiplexing processing unit 130 includes a multiplexing unit 131 and a framing unit 132. The multiplexing unit 131 sets the electrical path signal received from the ODU-SW 210 to the LO ODU frame. The multiplexing unit 131 first maps the LO ODU frame on an optical channel data tributary unit (ODTU) frame and then time-multiplexes a plurality of ODTU frames to generate an ODUCn frame which is a higher-order ODU (GO ODU). The framing unit 132 adds OH and forward error correction (FEC) to the ODUCn generated by the multiplexing unit 131 to generate an OTUCn frame. The framing unit 132 outputs a signal of the OTUCn frame to the line-side transmission processing unit 140.

The line-side transmission processing unit 140 includes an interleaving unit 141, OH processing units 142-1 to 142-n, multilane transmission units 143-1 to 143-n (n=4 in FIG. 1 as described above).

The interleaving unit 141 receives a signal of an OTUCn frame from the multiplexing processing unit 130, byte-interleaves the received signal of the OTUCn frame of n×100G (interleaves in units of bytes), and generates a signal of n OTLCn.n frames. The OTLCn.n frame is a frame of a parallel signal of 100G. The i-th OTLCn.n frame is referred to as an OTLCn.n#i frame (where i is an integer ranging from 1 to n). The interleaving unit 141 outputs the generated n OTLCn.n#i frames to the OH processing units 142-i.

The OH processing units 142-1 to 112-n set OH for the OTLCn.n frames received from the interleaving unit 141. The OH processing units 142-i output the OTLCn.n #i frame for which OH is set to the OH processing units 142-i.

The multilane transmission units 143-1 to 143-n output parallel signals of the OTLCn.n frames received from the OH processing units 142-1 to 142-n to the transmitters 220. For example, the multilane transmission units 143-i output parallel signals of OTLCn.n #i frames to the transmitters 220 in parallel using four electrical wires of 28G. The transmitters 220 use optical subcarriers of different optical frequencies.

The transmitters 220 convert the received parallel signals from electrical signals to optical signals and multicarrier—transmit the optical signals. A plurality of multilane transmission units 143-i may be connected a single transmitter 220. When j (where j ranges from 2 to n) multilane transmission units 143-i are connected to one transmitter 220, the transmitter 220 transmits j parallel signals by optical subcarriers of j×100G.

The reception processing unit 150 includes a line-side reception processing unit 160, a separation processing unit 170, and a client signal transmitting unit 180.

The line-side reception processing unit 160 includes multilane reception units 161-1 to 161-n, OH processing units 162-1 to 162-n, and a deinterleaving unit 163.

The multilane reception units 161-1 to 161-n receive optical signals received by receivers 230 using multicarrier transmission and converts the received optical signals into electrical signals. The receivers 230 receive the optical signals using optical subcarriers of different optical frequencies. The multilane reception units 161-i output the electrical signals received in parallel from the receivers 230 to the OH processing units 162-i, for example, using four electrical wires of 28G.

The OH processing units 162-1 to 162-n recognizes a head of a frame from the received signals on the basis of a frame alignment signal (FAS) or a multi-frame alignment signal (MFAS) to the OH of the OTLCn.n frame. By detecting the head position, the OH processing units 162-i compensate for a delay time difference, extract the OTLCn.n#i frame from the received signals, and output the extracted frame to the deinterleaving unit 163.

The deinterleaving unit 163 deinterleaves the OTLCn.n#1 frame to the OTLCn.n#n frame received from the OH processing units 162-1 to 162-n, and generates one OTUCn frame.

The separation processing unit 170 includes a deframing unit 171 and a demultiplexing unit 172.

The deframing unit 171 FEC-decodes signals of the OTUCn frames generated by the deinterleaving unit 163, extracts ODUCn frames in which the LO ODU frame is time-multiplexed from the decoded OTUCn frames, and outputs the extracted ODUCn frames to the demultiplexing unit 172

The demultiplexing unit 172 extracts LO ODU frames in which the client signals are set from the signals of the ODUCn frames extracted by the deframing unit 171, and outputs electrical path signals of the LO ODU frames to the ODU-SW 210.

The client signal transmitting unit 180 includes an OH processing unit 181, a demapping unit 182, and a transmission unit 183.

The OH processing unit 181 receives the electrical path signal from the ODU-SW 210 and decodes the LO ODU frames from the received electrical path signals. The OH processing unit 181 performs OH processing on the LO ODU frames, and outputs the processing result to the demapping unit 182.

The demapping unit 182 receives the electrical path signals of the LO ODU frames from the OH processing unit 181, extracts the client signals from the received electrical path signals, and outputs the extracted client signals to the transmission unit 183.

The transmission unit 183 transmits the client signals extracted by the demapping unit 182.

The client signal receiving unit 120, the multiplexing unit 130 may be connected without using the ODU-SW 210 and the separation processing unit 170 and the client signal transmitting unit 180 may be connected without using the ODU-SW 210.

Figure 2:
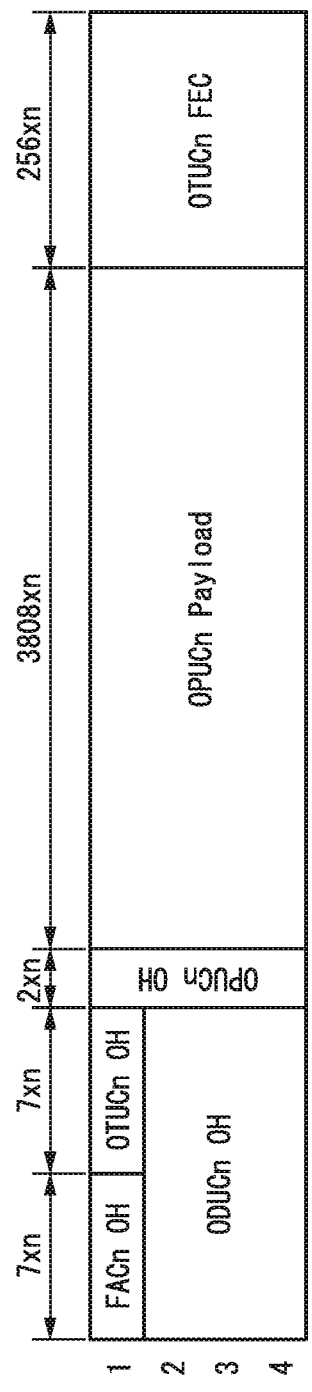
FIG. 2 is a diagram illustrating a frame structure of OTUCn according to the embodiment.

FIG. 2 is a diagram illustrating a frame structure of an OTUCn.

An OTUCn is generated by adding FACn OH, OTUCn OH, OPUCn OH, and OTUCnFEC to ODUCn. The OTUCn is marked in four rows and 4080×n columns.

Client signals are mapped on the (16×n+1)-th to 3824× n-th OPUCn payloads of the OTUCn. OH is set in the first to 16×n-th columns of the OTUCn frame. FACn OH is set in the first to 7×n-th columns of the first row, FACn OH includes information required for frame synchronization.

OTUCn OH accommodating section monitoring information of an optical channel is inserted into the (7×n+1)-th to 14×n-th columns. ODUCn OH is inserted into the first to 14×n-th columns of the second to fourth rows and path management and operation information of an optical channel is accommodated. OPUCn OH is inserted into the (14×n+1)-th to 16×n-th columns and information required for mapping/demapping of the client signals or the like is accommodated.

Parity check bytes for FEC are added to the OTUCn FEC of the (3824×n+1)-th to 4080×n-th columns. The FEC of the OTUCn frame may be omitted. The OTUCn FEC area is not limited to the (3824×n+1)-th to 4080×n-th areas but may be changed to an area including an arbitrary number of bytes.

Figure 3:
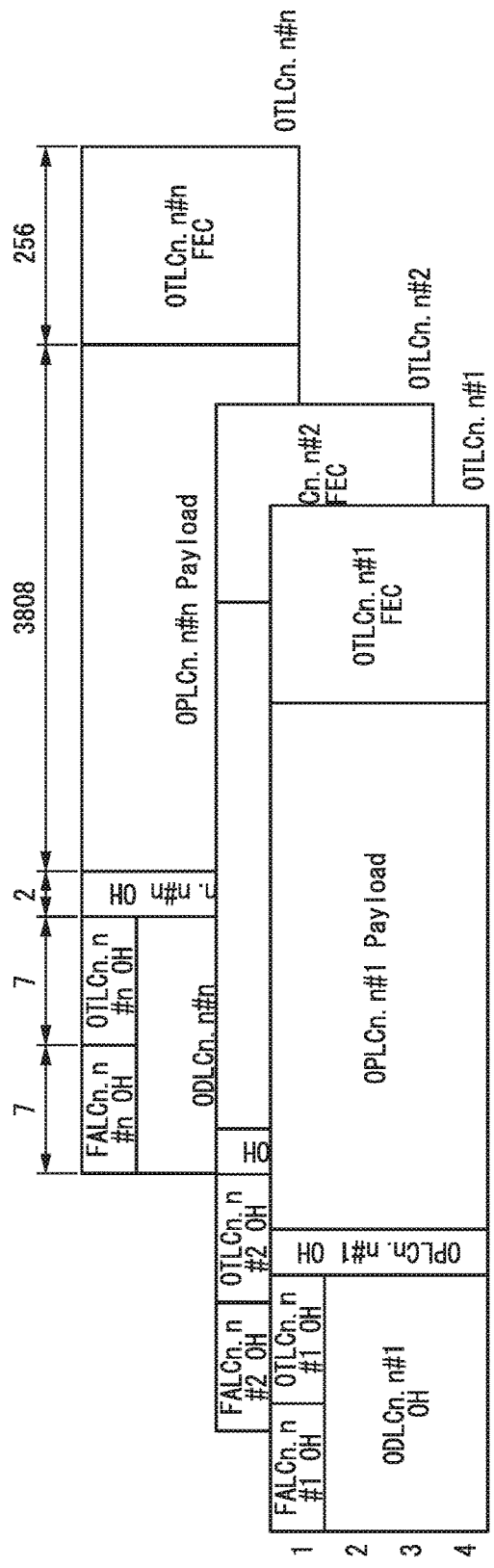
FIG. 3 is a diagram illustrating a frame structure of OTLCn.n according to the embodiment.

FIG. 3 is a diagram illustrating a frame structure of OTLCn.n.

The OTLCn.n is marked in four rows and 4080 columns. OTLCn.n#1 to OTLCn.n#n are acquired by dividing an OTUCn frame by byte interleaving.

OPUCn payloads of the OTUCn are mapped on OPUCn.n#i payloads of the seventeenth to 3824-th columns of the OTLCn.n#i.

OH is set in the first to sixteenth columns of the OTLCn.n#i. The OH of the OTLCn.n#i is set on the basis of the OTUCn OH.

FACn.n#i OH is set in the first to seventh columns of the first row. FACn.n#i OH includes information required for frame synchronization.

OTUCn.n#i OH accommodating section monitoring information of an optical channel is inserted into the eighth to fourteenth columns.

ODUCn.n#i OH is inserted into the first to fourteenth columns of the second to fourth rows and path management and operation information of an optical channel is accommodated.

OPUCn.n#i OH is inserted into the fifteenth to sixteenth columns and information required for mapping/demapping of the client signals or the like is accommodated.

Parity check bytes for FEC are added to the OTUTCn.n#i FEC of the 3825-th to 4080-th columns. The FEC of the OTUCn.n#i frame may be omitted. The OTUCn.n#i FEC area is not limited to the 3825-th to 4080-th areas but may be changed to an area including an arbitrary number of bytes.

FIGS. 4A to 4D are diagrams illustrating an optical channel which is used to transmit an optical signal.

Figure 4A:
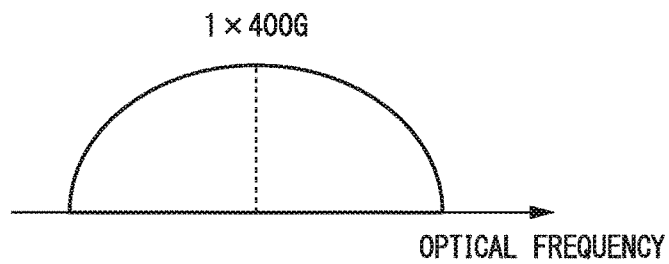
FIG. 4A is a diagram illustrating an example of an optical channel which is used to transmit an optical signal.
Figure 4B:
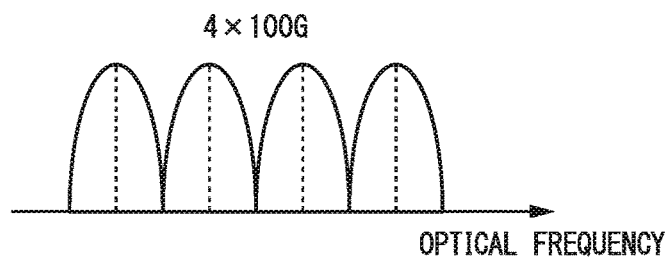
FIG. 4B is a diagram illustrating another example of an optical channel which is used to transmit an optical signal.

FIG. 4A is a diagram illustrating an optical channel when an optical signal of 400G is serial-transmitted by one optical frequency (a single carrier), and FIG. 4B is a diagram illustrating an optical channel when an optical signal of 400G is parallel-transmitted (multicarrier transmitted) by four optical subcarriers.

In a conventional electronic circuit, due to a constraint of an operating speed, it is difficult to continuously extend a band in which an optical signal can be serial-transmitted by one optical frequency over 100G as illustrated in FIG. 4A. Therefore, in the OTUCn, broadband transmission is realized without a constraint of the electronic circuit by parallel-transmitting a band over 100G by a plurality of optical subcarriers. Optical polarization division multiplexing, multilevel modulation, or the like is used for the parallel transmission. The band of an optical subcarrier varies depending on a modulation scheme.

Figure 4C:
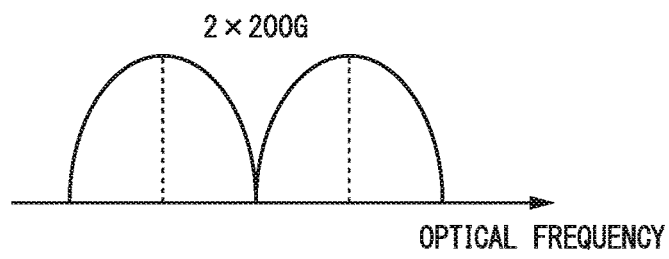
FIG. 4C is a diagram illustrating another example of an optical channel which is used to transmit an optical signal.
Figure 4D:
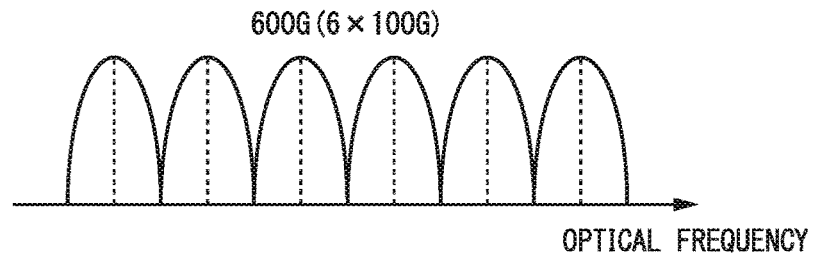
FIG. 4D is a diagram illustrating another example of an optical channel which is used to transmit an optical signal.

FIG. 4B illustrates an example in which one optical channel of 400G is parallel-transmitted by four optical subcarriers of 100G, and FIG. 4C illustrates an example in which one optical channel of 400G is parallel-transmitted by two optical subcarriers of 200G. By changing n, flexibility capable of increasing the transmission band by 100G is provided as illustrated in FIG. 4D.

Figure 5:
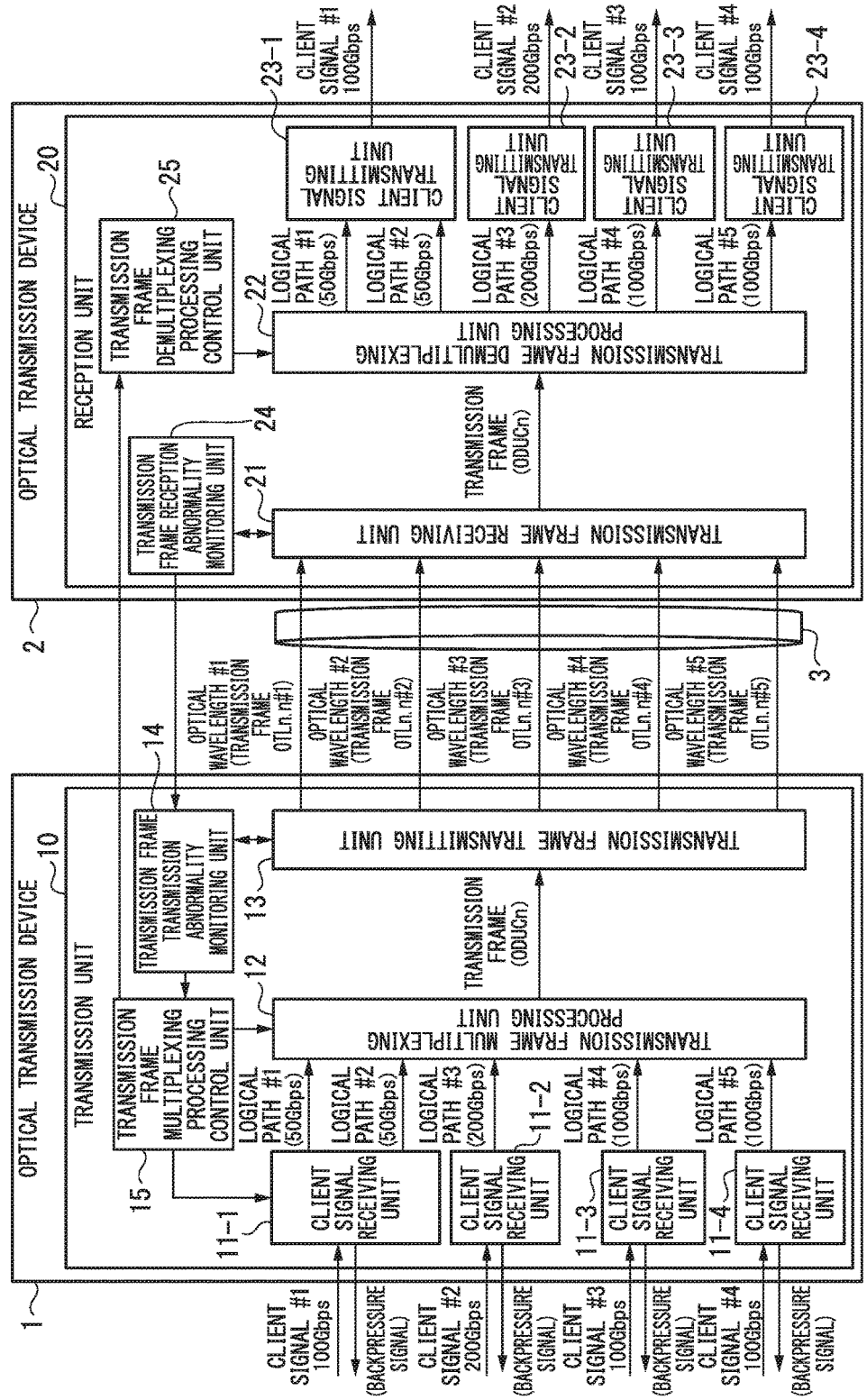
FIG. 5 is a block diagram illustrating a configuration of an optical channel transmission system according to an embodiment of the present invention.

The optical channel transmission system according to an embodiment of the invention will be described below with reference to FIG. 5. FIG. 5 is a block diagram illustrating a configuration of the optical channel transmission system according to the embodiment.

As illustrated in FIG. 5, the optical channel transmission system includes a transmission-side optical transmission device 1 and a reception-side optical transmission device 2. The transmission-side optical transmission device 1 includes a transmission unit 10 and the reception-side optical transmission device 2 includes a reception unit 20. In the drawing, the optical transmission device 1 includes only one transmission unit 10, but may include a plurality of transmission units 10 using different optical channels. The optical transmission device 2 includes only one reception unit 20, but may include a plurality of reception units 20 corresponding to the optical channels as the transmission units 10.

The transmission unit 10 is constituted by a framer and a transmitter and includes client signal receiving units 11-1 to 11-4, a transmission frame multiplexing processing unit 12, a transmission frame transmitting unit 13, a transmission frame transmission abnormality monitoring unit 14, and a transmission frame multiplexing processing control unit 15.

The reception unit 20 is constituted by a receiver and a framer and includes a transmission frame receiving unit 21, a transmission frame demultiplexing processing unit 22, client signal transmitting units 23-1 to 23-4, a transmission frame reception abnormality monitoring unit 24, and a transmission frame demultiplexing processing control unit 25. The transmission unit 10 and the reception unit 20 are connected to each other by a transmission line 3 for transmitting an optical channel.

The client signal receiving units 11-1 to 11-4 have the same function as the client signal receiving unit 120 illustrated in FIG. 1. The client signal receiving units 11-1 to 11-4 receive client signals of Ethernet (registered trademark) or the like, generate logical path traffic, and transmit the logical path traffic to the transmission frame multiplexing processing unit 12. The logical path traffic is a client signal set in an LO ODU frame.

Generation of the logical path traffic from the client signals is performed, for example, by distribution based on a virtual local area network (VLAN) tag of Ethernet (registered trademark). In the example illustrated in FIG. 5, client signal #1 of 100 Gbps (gigabits per second) is input to the client signal receiving unit 11-1. Then, the client signal receiving unit 11-1 generates two logical paths #1 and #2 of 50 Gbps.

Similarly, client signal #2 of 200 Gbps is input to the client signal receiving unit 11-2. Then, the client signal receiving unit 11-2 generates logical path #3 of 200 Gbps. Client signal #3 of 100 Gbps is input to the client signal receiving unit 11-3. Then, the client signal receiving unit 11-3 generates logical path 44 of 100 Gbps. Client signal #4 of 100 Gbps is input to the client signal receiving unit 11-4. Then, the client signal receiving unit 11-4 generates logical path #5 of 100 Gbps. Logical path #k is a logical path with a logical path ID of "#k."

The transmission frame multiplexing processing unit 12 has the same function as the multiplexing unit 131 illustrated in FIG. 1. The transmission frame multiplexing processing unit 12 generates ODUCn which is a transmission frame constituting an optical channel by multiplexing a plurality of received logical path traffics. The transmission frame multiplexing processing unit 12 transmits the generated transmission frame to the transmission frame transmitting unit 13.

An optical channel is divided into a plurality of time slots by time division multiplexing and embodies multiplexing of a plurality of logical path traffics by allocating the logical path traffics to the time slots. An embodied example is an ODU multiplexing system using an ODTU frame which is defined in international telecommunication union telecommunication standardization sector (ITU-T) G.709.

The transmission frame transmitting unit 13 has the same function as the framing unit 132, the line-side transmission processing unit 140, and the transmitter 220. The transmission frame transmitting unit 13 divides the received transmission frame into transmission frames OTLCn.n #1 to #n and transmits parallel signals of transmission frames OTL- Cn.n #1 to #n to the transmission line 3 by a plurality of optical wavelengths for multicarrier transmission using a plurality of optical subcarriers.

The optical wavelengths of the optical subcarriers which are used for optical transmission by time slots are determined in advance. In optical wavelength #1, parallel signals of transmission frame OTLCn.n #1, transmission frame OTLCn.n #2, transmission frame OTLCn.n #3, transmission frame OTLCn.n #4, and transmission frame OTLCn.n #5 are transmitted to the transmission line 3.

The transmission frame receiving unit 21 has the same function as the receiver 230, the line-side reception process unit 160, and the deframing unit 171 illustrated in FIG. 1. The transmission frame receiving unit 21 restores the transmission frame by reversing the operation of the transmission frame transmitting unit 13 and outputs the restored transmission frame to the transmission frame demultiplexing processing unit 22.

The transmission frame demultiplexing processing unit 22 has the same function as the demultiplexing 172 illustrated in FIG. 1. The transmission frame demultiplexing processing unit 22 outputs client signals via logical paths #1 to #5 by reversing the operation of the transmission frame multiplexing processing unit 12. The transmission frame demultiplexing processing unit 22 outputs logical path #1 of 50 Gbps and logical path #2 of 50 Gbps to the client signal transmitting unit 23-1. The transmission frame demultiplexing processing unit 22 outputs logical path #3 of 200 Gbps to the client signal transmitting unit 23-12. The transmission frame demultiplexing processing unit 22 outputs logical path #4 of 100 Gbps to the client signal transmitting unit 23-3. The transmission frame demultiplexing processing unit 22 outputs logical path #5 of 100 Gbps to the client signal transmitting unit 23-4.

The client signal transmitting units 23-1 to 23-4 have the same function as the client signal transmitting unit 180 illustrated in FIG. 1. The client signal transmitting unit 23-1 receives inputting of two logical paths #1 and #2 of 50 Gbps and outputs client signal #1 of 100 Gbps by reversing the operation of the client signal receiving unit 11-1.

The client signal transmitting unit 23-2 receives inputting of logical path #3 of 200 Gbps and outputs client signal #2 of 200 Gbps by reversing the operation of the client signal receiving unit 11-2. The client signal transmitting unit 23-3 receives inputting of logical path #4 of 100 Gbps and outputs client signal #3 of 100 Gbps by reversing the operation of the client signal receiving unit 11-3. The client signal transmitting unit 23-3 receives inputting of logical path #5 of 100 Gbps and outputs client signal #4 of 100 Gbps by reversing the operation of the client signal receiving unit 11-4.

The transmission frame reception abnormality monitoring unit 24 monitors abnormality of the transmission frame receiving unit 21 and notifies the transmission frame transmission abnormality monitoring unit 14 of abnormality information when abnormality occurs in a received optical wavelength.

For example, when a signal of a specific optical wavelength is not received, the transmission frame reception abnormality monitoring unit 24 detects abnormality of the optical wavelength. For example, the transmission frame reception abnormality monitoring unit 24 detects abnormality of an optical wavelength which is used for reception by a physical port due to abnormality of the physical port or the like. The abnormality information indicates an abnormal time slot which is a time slot affected by the abnormality of the optical wavelength.

The transmission frame transmission abnormality monitoring unit 14 monitors abnormality of the transmission frame transmitting unit 13 and notifies the transmission frame multiplexing processing control unit 15 of abnormality information indicating an abnormal time slot which is affected by abnormality of the optical wavelength when abnormality occurs in the transmitted optical wavelength.

For example, the transmission frame transmission abnormality monitoring unit 14 detects abnormality of an optical wavelength which is used for reception by a physical port due to abnormality of the physical port or the like. When abnormality information from the transmission frame reception abnormality monitoring unit 24 is received, the transmission frame transmission abnormality monitoring unit 14 notifies the transmission frame multiplexing processing control unit 15 of the received abnormality information. Accordingly, when abnormality of an optical wavelength occurs in either of the transmission frame transmitting unit 13 or the transmission frame receiving unit 21, the transmission frame multiplexing processing control unit 15 can acquire information of an abnormality time slot affected thereby.

The transmission frame multiplexing processing control unit 15 instructs the transmission frame multiplexing processing unit 12 on which time slot to map which logical path traffic. The transmission frame multiplexing processing control unit 15 notifies the transmission frame demultiplexing processing control unit 25 of the information. When abnormality information indicating an abnormal time slot is received from the transmission frame transmission abnormality monitoring unit 14, the transmission frame multiplexing processing control unit 15 changes a state of mapping of logical path traffics on time slots on the basis of the received abnormality information. The transmission frame multiplexing processing control unit 15 transmits details of the change to the transmission frame multiplexing processing unit 12 and notifies the transmission frame demultiplexing processing control unit 25 of the information indicating details of the change. The transmission frame multiplexing processing control unit 15 notifies the client signal receiving units 11-1 to 11-4 corresponding to a logical path requiring band limiting of information on a logical path requiring band limiting and a limited band of the logical path.

When the information on a logical path requiring band limiting and a limited band of the logical path is received from the transmission frame multiplexing processing control unit 15, the client signal receiving units 11-1 to 11-4 transmit a backpressure signal in which the information on a limited band to a device of a transmission source of the corresponding logical path. Accordingly, the device of a transmission source transmitting a client signal using the logical path requiring band limiting is instructed to reduce traffic to the limited band.

The transmission frame demultiplexing processing control unit 25 notifies the transmission frame demultiplexing processing unit 22 of on which time slot to map which logical path traffic on the basis of the information received from the transmission frame multiplexing processing control unit 15.

Figures 6, 7:
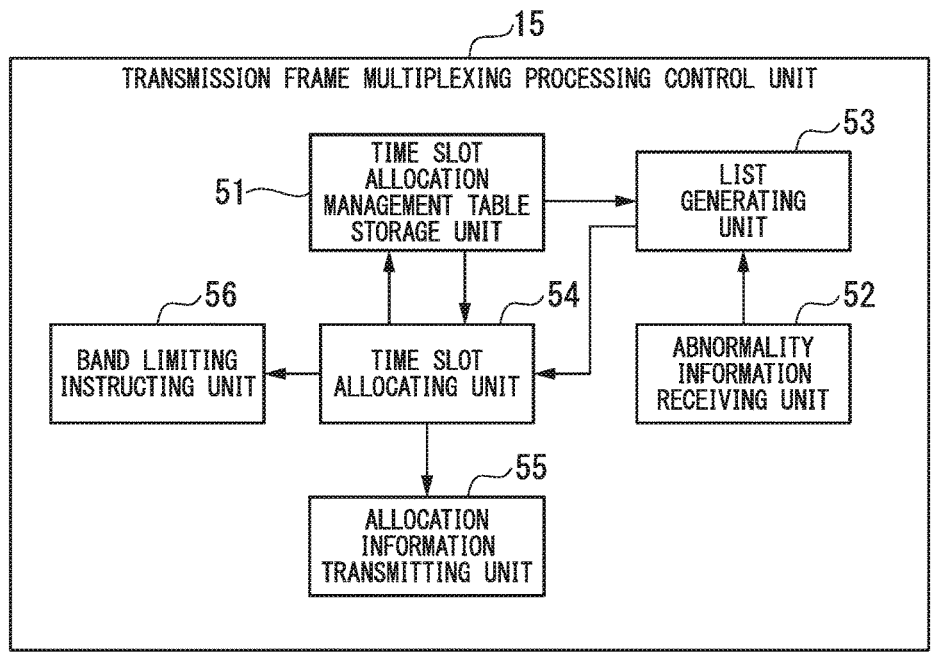
FIG. 6 is a block diagram illustrating a transmission frame multiplexing processing control unit illustrated in FIG. 5.
FIG. 7 is a diagram illustrating a configuration of time slots of a transmission frame according to the embodiment.

A detailed configuration of the transmission frame multiplexing processing control unit 15 illustrated in FIG. 5 will be described below with reference to FIG. 6. FIG. 6 is a block diagram illustrating a detailed configuration of the transmission frame multiplexing processing control unit 15 illustrated in FIG. 5.

As illustrated in FIG. 6, the transmission frame multiplexing processing control unit 15 includes a time slot allocation management table storage unit 51, an abnormality information receiving unit 52, a list generating unit 53, a time slot allocating unit 54, an allocation information transmitting unit 55, and a band limiting instructing unit 56.

The time slot allocation management table storage unit 51 stores a time slot allocation management table that manages an allocation state of a logical path to time slots. The abnormality information receiving unit 52 receives abnormality information transmitted from the transmission frame transmission abnormality monitoring unit 14 or the transmission frame reception abnormality monitoring unit 24. The list generating unit 53 generates list information required for allocation to time slots from collected information. The time slot allocating unit 54 dynamically changes a mapping state of logical paths to time slots with reference to the time slot allocation management table or the list information generated by the list generating unit 53.

At this time, the time slot allocating unit 54 performs band limiting to reduce a transmission band capable of transmitting logical paths if necessary and then changes the mapping state to avoid the time slot corresponding to the optical wavelength having abnormality occurred. The time slot allocating unit 54 updates the time slot allocation management table stored in the time slot allocation management table storage unit 51 on the basis of the changed mapping state.

The allocation information transmitting unit 55 transmits information on the changed mapping state on the time slots to the transmission frame multiplexing processing unit 12 and the transmission frame demultiplexing processing control unit 25. When a logical path is subjected to band limiting, the band limiting instructing unit 56 notifies the client signal receiving units 11-1 to 11-4 corresponding to a logical path having band limiting performed thereon of the information on a logical path having band limiting performed thereon and a limited band of the logical path.

A configuration of time slots of a transmission frame (ODUCn) will be described below with reference to FIG. 7. FIG. 7 is a diagram illustrating a configuration of time slots of a transmission frame. Here, it is assumed that optical channel has a band of 500 Gbps (a data transmission rate) as a whole. In the drawing, for the purpose of simplification, 100 Gbps is illustrated by ten time slots.

A minimum rectangle in FIG. 7 is a time slot and time slot IDs 1 to 50 are given to the time slots. Time slots with time slot IDs 1 to 10 are allocated to optical wavelength #1. Similarly, time slots with time slot IDs 11 to 20 are allocated to optical wavelength #2. Time slots with time slot IDs 21 to 30 are allocated to optical wavelength #3. Time slots with time slot IDs 31 to 40 are allocated to optical wavelength #4. Time slots with time slot IDs 41 to 50 are allocated to optical wavelength #5.

Client signals mapped on the time slots allocated to optical wavelength #i are transmitted by optical subcarriers of optical wavelength #i using parallel signals of transmission frame OTLCn.n#i.

In the example illustrated in FIG. 7, the number of time slots is set to 50, but the number of time slots is not limited thereto and may be greater than 50.

Division into the time slots is performed for each optical channel.

A table structure of the time slot allocation management table stored in the time slot allocation management table storage unit 51 illustrated in FIG. 6 will be described below with reference to FIG. 8. FIG. 8 is a diagram illustrating a table structure of the time slot allocation management table.

Here, it is assumed that whole optical channel #1 has a band of 500 Gbps (a data transmission rate).

The time slot allocation management table is data including records in which "logical path ID," "transmission band," and "allocated time slot ID" are correlated with each other. IDs of logical paths are stored in the field of "logical path ID." Values of transmission bands of the correlated logical paths are stored in the field of "transmission band." IDs of time slots (ID 1 to 50 in this example) to which the correlated logical paths are allocated are stored in the field of "allocated time slot ID." A logical path is allocated to the number of time slots corresponding to the band of the logical path by the time slot allocating unit 54. An ID of a time slot which is not allocated is not stored in the field of "allocated time slot ID."

A configuration of the abnormal time slot list which is received by the abnormality information receiving unit 52 illustrated in FIG. 6 will be described below with reference to FIG. 9. FIG. 9 is a diagram illustrating a configuration of the abnormal time slot list which is received by the abnormality information receiving unit 52 illustrated in FIG. 6.

The abnormal time slot list is an example of abnormality information which is transmitted from the transmission frame transmission abnormality monitoring unit 14 or the transmission frame reception abnormality monitoring unit 24 and is list information in which a time slot ID of an abnormal time slot which is a time slot affected by abnormality of an optical wavelength is described. In the example illustrated in FIG. 9, time slots with time slot IDs of 21, 22, 23, 24, 25, 26, 27, 28, 29, and 30 are abnormal. The abnormal time slots are time slots corresponding to the optical wavelength in which abnormality occurs.

A configuration of an abnormal logical path ID list which is generated by the list generating unit 53 illustrated in FIG. 6 will be described below with reference to FIG. 10. FIG. 10 is a diagram illustrating the configuration of the abnormal logical path ID list which is generated by the list generating unit 53 illustrated in FIG. 6.

The abnormal logical path ID list is generated with reference to the time slot allocation management table and the abnormal time slot list by the list generating unit 53. The list generating unit 53 specifies an ID of a logical path which is an allocation destination of an abnormal time slot and generates the abnormal logical path ID list in which the ID of the specified logical path is described. In the example illustrated in FIG. 10, a logical path with a logical path ID of #3 has abnormality. The logical path having abnormality is also referred to as an abnormal logical path.

Figures 11, 12:
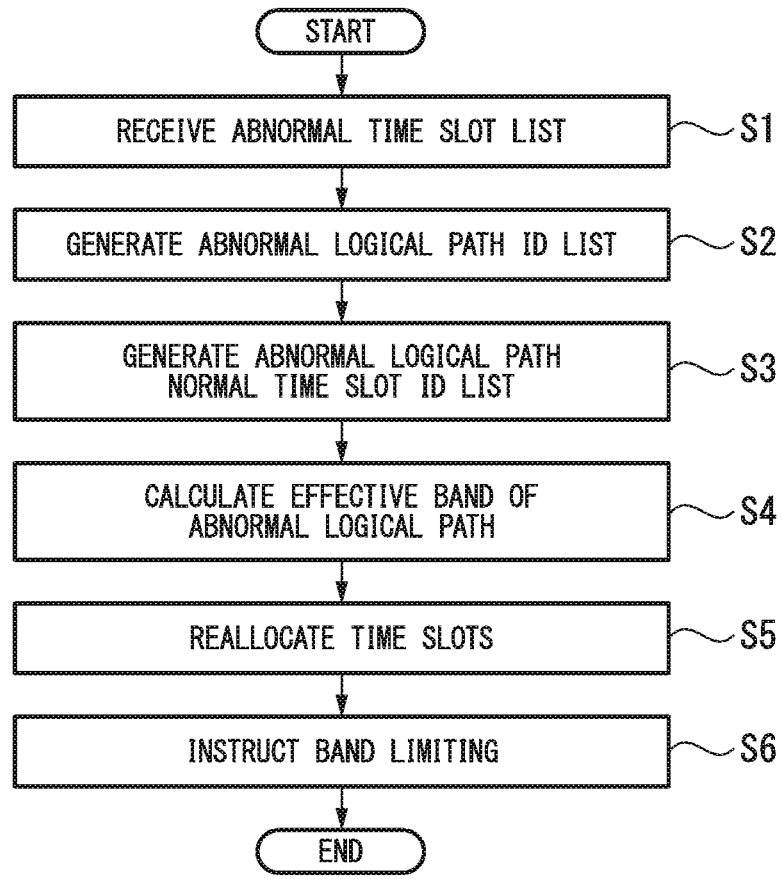
FIG. 11 is a diagram illustrating a configuration of an abnormal logical path normal time slot ID list which is generated by the list generating unit illustrated in FIG. 6.
FIG. 12 is a flowchart illustrating a processing operation of the transmission frame multiplexing processing control unit illustrated in FIG. 6.

A configuration of an abnormal logical path normal time slot ID list which is generated by the list generating unit 53 illustrated in FIG. 6 will be described below with reference to FIG. 11. FIG. 11 is a diagram illustrating the configuration of the abnormal logical path normal time slot ID list which is generated by the list generating unit 53 illustrated in FIG. 6.

The abnormal logical path normal time slot ID list is generated with reference to the time slot allocation management table and the abnormal time slot list by the list generating unit 53. The abnormal logical path normal time slot ID list is list information in which a time slot ID of an abnormal logical path normal time slot which is a time slot not having abnormality among time slots which are allocated to the abnormal logical path included in the abnormal logical path ID list is described.

In the example illustrated in FIG. 11, the time slots with time slot IDs of 11 to 20 among the time slots allocated to the logical path with a logical path ID of #3 indicate abnormal logical path normal time slots not having abnormality.

A processing operation of the transmission frame multiplexing processing control unit 15 illustrated in FIG. 6 will be described below with reference to FIG. 12 FIG. 12 is a flowchart illustrating the processing operation of the transmission frame multiplexing processing control unit 15 illustrated in FIG. 6.

First, the abnormality information receiving unit 52 receives the abnormal time slot list from the transmission frame transmission abnormality monitoring unit 14 or the transmission frame reception abnormality monitoring unit 24 (Step S1). The abnormality information receiving unit 52 outputs the received abnormal slot list to the list generating unit 53.

Then, the list generating unit 53 generates a abnormal logical path ID list (FIG. 10) which is a list of abnormal logical paths to which time slots included in the abnormal time slot list FIG. 9) are allocated (Step S2). The list generating unit 53 specifies a record in which an ID of an abnormal time slot described in the abnormal time slot list is set in the allocated time slot ID of the time slot allocation management table (see FIG. 8) and reads the logical path ID of the specified record. Accordingly, the list generating unit 53 specifies the ID of the logical path including an abnormal time slot as an allocation destination and generates the abnormal logical path ID list in which the ID of the specified logical path.

Then, the list generating unit 53 generates an abnormal logical path normal time slot ID list (see FIG. 11) which is a list of IDs of time slots not having abnormality among the time slots allocated to the logical path included in the abnormal logical path ID list (Step S3).

The list generating unit 53 specifies a record in the time slot allocation management table on the basis of the logical path ID included in the abnormal logical path ID list. The list generating unit 53 excludes the ID of the time slots included in the abnormal time slot list from the IDs of the time slots set as the allocated time slot IDs of the specific record and acquires abnormal logical path normal time slot IDs. The list generating unit 53 generates an abnormal logical path normal time slot list in which the logical path ID read from the abnormal logical path ID list is correlated with the IDs of the abnormal logical path normal time slots acquired using the logical path ID.

When a plurality of logical path IDs are included in the abnormal logical path ID list, the list generating unit 53 generates the abnormal logical path normal time slot ID list for each logical path. The list generating unit 53 outputs the generated abnormal logical path ID list and the generated abnormal logical path normal time slot ID list to the time slot allocating unit 54.

The time slot allocating unit 54 calculates an effective band which is a transmission band corresponding to the time slots not having abnormality in the transmission band of the abnormal logical path for each abnormal logical path with reference to the abnormal logical path normal time slot ID list (Step S4). The effective band of the abnormal logical path can be calculated from the number of time slots of which the ID is set in correlation with the abnormal logical path in the abnormal logical path normal time slot ID list.

The time slot allocating unit 54 reallocates time slots with reference to information of the time slot allocation management table and the lists (Step S5). The time slot allocating unit 54 narrows the transmission band capable of transmitting the abnormal logical path of which the ID is set in the abnormal logical path ID list to the effective band of the abnormal logical path to reconfigure an abnormal logical path, and reallocates the time slots of an allocation destination of the abnormal logical path using the time slots included in the abnormal logical path normal time slot ID list. The time slot allocating unit 54 updates the time slot allocation management table stored in the time slot allocation management table storage unit 51 depending on the reallocation result.

Accordingly, the allocation information transmitting unit 55 transmits information on the reallocation result of time slots to the transmission frame multiplexing processing unit 12 and the transmission frame demultiplexing processing control unit 25.

The transmission frame multiplexing processing unit 12 sets the client signals received by the logical paths to the time slots of ODUCn on the basis of the information on the reallocation result of time slots received from the transmission frame multiplexing processing control unit 15.

The transmission frame demultiplexing processing control unit 25 updates the time slot allocation management table on the basis of the information on the reallocation result of time slots received from the transmission frame multiplexing processing control unit 15, and outputs the information on the reallocation result of time slots to the transmission frame demultiplexing processing unit 22. The transmission frame demultiplexing processing twit 22 extracts client signals of the logical paths from ODUCn on the basis of the information received from the transmission frame demultiplexing processing control unit 25.

When band limiting of a logical path is performed, the band limiting instructing unit 56 notifies the client signal receiving units 11-1 to 11-4 corresponding to a logical path having band limiting performed thereon of information on a logical path having band limiting performed thereon and the limited band of the logical path (Step S6). When the information on a logical path having band limiting performed thereon and the limited band of the logical path is received, the client signal receiving units 11-1 to 11-4 transmits a backpressure signal in which the information on the limited band of the logical path is set to the device of a transmission source of the logical path.

Figure 13:
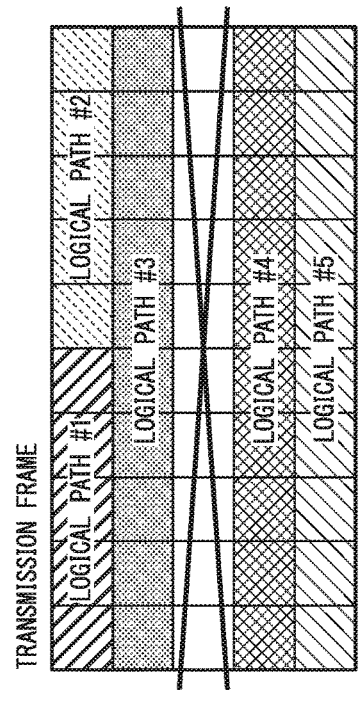
FIG. 13 is a diagram illustrating an example of a process of mapping logical path traffic on time slots according to the embodiment.
Figure 13:
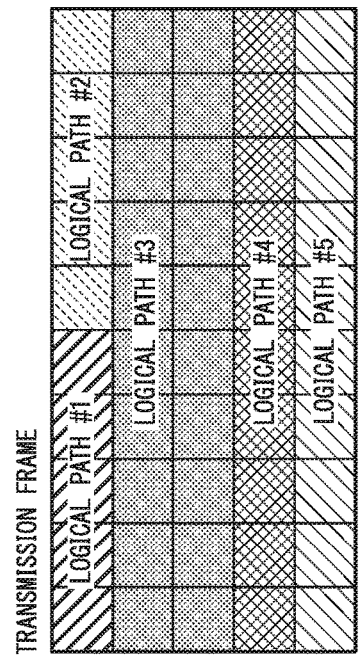

A specific example of the process of reallocating time slots will be described below with reference to FIG. 13. FIG. 13 is a diagram illustrating a process of mapping logical path traffic to time slots. First, as an initial state, the time slot allocating unit 54 performs a time slot allocating process by sequentially mapping logical paths #1 to #5 on optical channel #1 of 500 Gbps sequentially in an increasing order of time slot IDs. Then, the time slot allocating unit 54 generates the time slot allocation management table in an initial state illustrated in the upper-left part of FIG. 13 and registers the time slot allocation management table in the storage unit. Allocation of logical paths #1 to #5 to time slots in the initial state is illustrated in the lower-left part of FIG. 13. The time slots are specified by IDs of 1 to 50.

The abnormality information receiving unit 52 of the transmission frame multiplexing processing control unit 15 acquires an abnormal time slot list {21, 22, 23, 24, 25, 26, 27, 28, 29, 30} (see FIG. 9) (Step S1).

The list generating unit 53 specifies a record in which an ID of an abnormal time slot described in the abnormal time slot list is correlated with the allocated time slot ID in the time slot allocation management table. The list generating unit 53 generates the abnormal logical path ID list {#3} (see FIG. 10) in which the logical path ID read from the specified record is set (Step S2).

The list generating unit 53 specifies a record in the time slot allocation management table on the basis of logical path #3 set in the abnormal logical path ID list and reads ID 11 to 30 of time slots from the allocated time slot IDs of the specific records. The list generating unit 53 excludes the time slot IDs 21 to 30 set in the abnormal time slot list from the read time slot IDS 11 to 30 and acquires the IDs 11 to 20 of the abnormal logical path normal time slots. The list generating unit 53 generates an abnormal logical path normal time slot ID list (see FIG. 11) in which the ID of logical path #3 and the IDs 11 to 20 of the abnormal logical path normal time slots are correlated with each other (Step S3).

The time slot allocating unit 54 calculates the effective band of logical path #3 to be 100G on the basis of the number of abnormal logical path normal time slots correlated with logical path #3 in the abnormal logical path normal time slot ID list (Step S4).

The time slot allocating unit 54 changes mapping of the logical paths on the time slots to limit the transmission band such that the band of logical path #3 can be transmitted using only the abnormal logical path normal time slots.

Here, the time slot allocating unit 54 narrows the transmission band of logical path #3 from 200G to 100G which is the effective band. Then, the time slot allocating unit 54 changes the allocation destination of logical path #3 to the time slots with IDs 11 to 20 which are the abnormal logical path normal time slots of logical path set in the abnormal logical path normal time slot ID list (Step S5).

In this way, the transmission frame multiplexing processing control unit 15 limits the transmission band to transmit the transmission band of the abnormal logical path using only the time slots not having abnormality, allocates the time slots to the limited band, and updates the time slot allocation management table as illustrated in the upper-right of FIG. 13. The lower-right part of FIG. 13 illustrates a transmission frame after reallocation of time slots.

The hand limiting instructing unit 56 notifies the client signal receiving unit 11-2 of the information on logical path #3 having band limiting performed thereon and the limited band 100 Gbps of logical path #3 (Step S6). The client signal receiving unit 11-2 transmits a backpressure signal in which the limited band 100 Gbps is set to the device of a transmission source of logical path 43.

Figure 14:
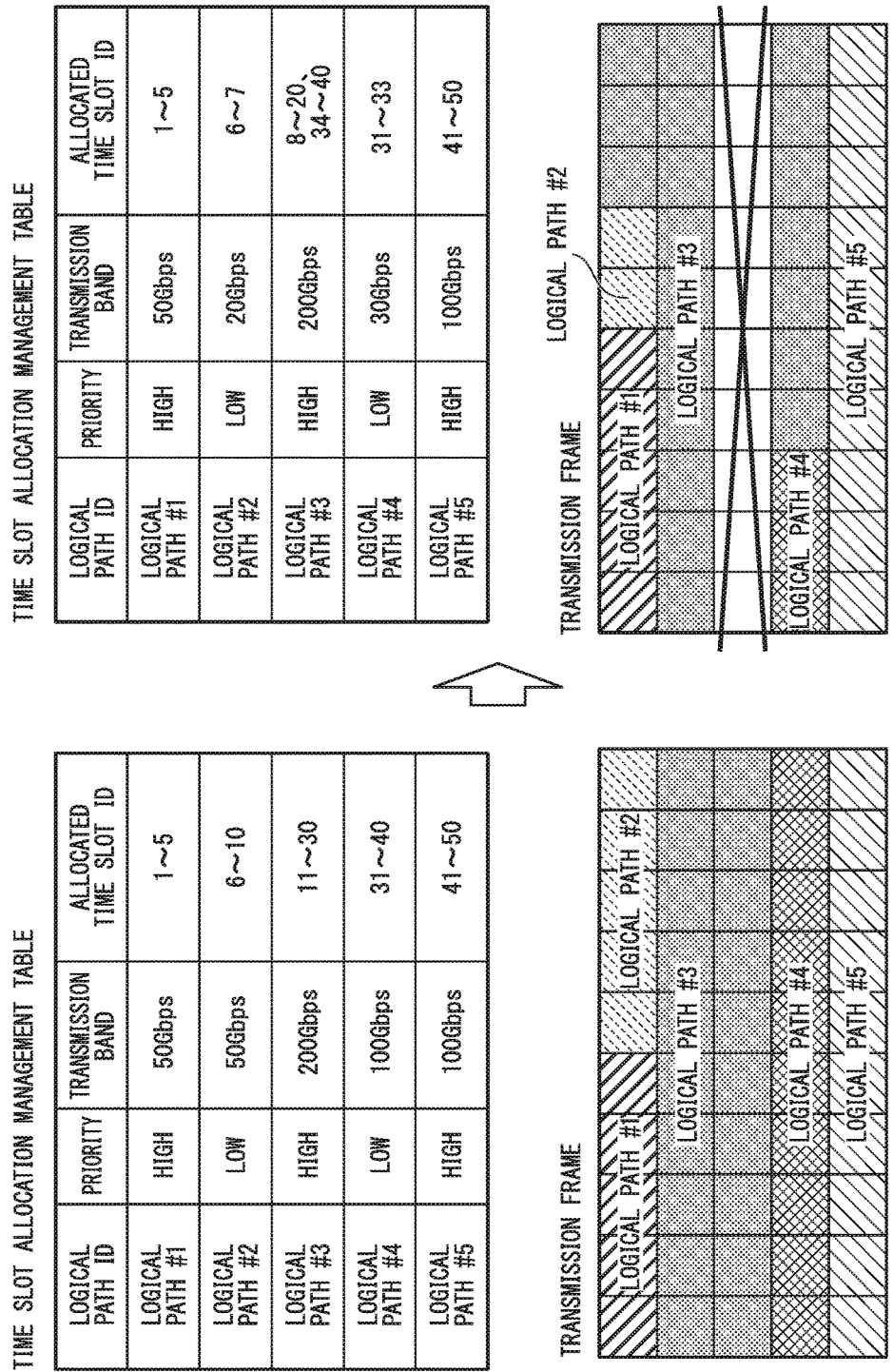
FIG. 14 is a diagram illustrating another example of a process of mapping logical path traffic on time slots according to the embodiment.

The time slot allocating unit 54 may preferentially narrow a logical path having a lower priority in the process of narrowing the transmission band of a logical path in Step S5. FIG. 14 is a diagram illustrating a process of mapping logical path traffic on time slots when the transmission band of a logical path having a low priority is preferentially narrowed.

As illustrated in the upper-left part and the lower-left part of FIG. 14, mapping of logical paths 41 to 45 in the initial state is the same as illustrated in FIG. 13. In the time slot allocation management table, priorities of the logical paths are additionally set. The priorities of logical paths #1, #3, and #5 are "high" and the priorities of logical paths #2 and #4 are "low."

When the abnormality information receiving unit 52 receives an abnormal time slot list {21, 22, 23, 24, 25, 26, 27, 28, 29, 30}, the list generating unit 53 generates an abnormal logical path ID list and an abnormal logical path normal time slot ID list similarly to FIG. 13. The list generating unit 53 reads logical path IDs #1, #2, #4, and #5 in which the IDs of the abnormal time slots set in the abnormal time slot list re not included in the allocated time slot IDs from the time slot allocation management table. The list generating unit 53 generates a normal logical path ID list in which the read logical path IDs #1, #2, #4__ and #5 are set.

The time slot allocating unit 54 specifies logical paths #2 and #4 having a lower priority than that of logical path #3 set in the abnormal logical path ID list among logical paths #1, #2, #4, and #5 set in the normal logical path ID list with reference to the time slot allocation management table. The time slot allocating unit 54 narrows the transmission band 100 Gbps corresponding to the abnormal time slots included in the allocation destination of logical path #3 from the total transmission band of logical path #2 and logical path #4. For example, the transmission band may be narrowed from logical path #2 and logical path #4 on the basis of a ratio of the transmission bands of the logical paths or may be narrowed from only logical path #4 which is equal to or greater than the transmission band corresponding to the abnormal time slots.

Here, the transmission band of logical path #2 is narrowed from 50 Gbps to 20 Gbps and the transmission band of logical path #4 is narrowed from 100 Gbps to 30 Gbps. The time slot allocating unit 54 reallocates the time slots of the allocation destination of logical path #2 to the time slots corresponding to the transmission bands 20 Gbps of the IDs 6 and 7. The time slot allocating unit 54 reallocates the time slots of the allocation destination of logical path #4 to the time slots corresponding to the transmission band 30 Gbps of the IDs 31 to 33.

Accordingly, since time slots corresponding to 100 Gbps of the IDs 8 to 10 and 34 to 40 not having abnormality are available, the time slot allocating unit 54 allocates the available time slots to logical path 43 and adds the IDs to the abnormal logical path normal time slot ID list.

In this way, the transmission frame multiplexing processing control reallocates time slots of each logical path to preferentially limit the transmission band of a normal logical path having a lower priority than that of the abnormal logical path and updates the time slot allocation management table as illustrated in the upper-right part of FIG. 14. The lower-right part of FIG. 14 illustrates a transmission frame after time slots are reallocated.

When the transmission band of a logical path having a lower priority than the abnormal logical path is narrowed to 0 or a predetermined minimum value but does not reach the transmission band of the abnormal time slots included in the allocation destination of the abnormal logical path, the time slot allocating unit 54 narrows the transmission band of the abnormal logical path and reallocates the time slots.

The band limiting instructing unit 56 notifies the client signal receiving unit 11-1 of the information on logical path 42 and the limited band 20 Gbps of logical path #2. The client signal receiving unit 11-1 transmits a backpressure signal in which the limited band 20 Gbps of logical path 42 is set to the device of a transmission source of logical path #2. The band limiting instructing unit 56 notifies the client signal receiving unit 11-3 of the information on logical path 44 having the band limiting performed thereon and the limited band 30 Gbps of logical path #4.

The client signal receiving unit 11-3 transmits a backpressure signal in which the limited band 30 Gbps is set to the device of a transmission source of logical path #4 (Step S6).

FIG. 14 illustrates an example in which the priority has two steps of "high" and "low," but the priority has three or more steps. For example, the priority may be set to multiple values such as values from 0 to 7. The transmission frame multiplexing processing control unit 15 preferentially narrows the transmission band of a normal logical path having a lower priority than the abnormal logical path and reallocates the time slots of the logical paths. At this time, when a plurality of normal logical paths having a lower priority than the abnormal logical path are present, the normal logical paths of which the transmission band is narrowed may be selected on the basis of the priority such as in an increasing order of priorities. Alternatively, the transmission band to be narrowed for each normal logical path having a lower priority than the abnormal logical path may be determined on the basis of the priority.

In addition to the above-mentioned OTUCn, in OTUCn-M, a standard of a client signal of less than 100G of which the band is variable in a unit of gigabits per second is set (for example, in case of M=60, the transmission rate is 300 gigabits per second equal to "5×60"). An OTUCn frame has a unit of 100G without depending on the bands of optical subcarriers. Accordingly, when the band of an optical subcarrier is not a multiple of 100G, a fraction thereof has to be considered. Accordingly, at the time of reallocation of a logical path, an area (a time slot) in which a client signal is not accommodated needs to be explicitly known.

FIG. 15 illustrates the process of snapping a logical path when an unavailable time slot is set in addition to the mapping process illustrated in FIG. 14. In FIG. 15, time slots marked by a combination of a circle and a hatching represent unavailable bands (time slots).

As illustrated in the upper-left part and the lower-left part of FIG. 15, mapping of logical paths #1 to #5 in an initial state is performed except for unavailable time slots 6, 7, 11, 12, 21, 22, 33, 34, 49, and 50. As in the example illustrated in FIG. 14, the priorities of logical paths #1, #3, and #5 are "high" and the priorities of logical paths #2 and #4 are "low."

The transmission frame multiplexing processing control unit 15 performs reallocation of time slots except an area in which a client signal cannot be accommodated in addition to the process described above with reference to FIG. 14. That is, regarding logical paths #2 and #4 having a lower priority than logical path #3, the transmission frame multiplexing processing control unit 15 narrows the transmission band of logical path #2 from 90 Gbps to 40 Gbps and narrows the transmission band of logical path #4 from 60 Gbps to 30 Gbps. Thereafter, the transmission frame multiplexing processing control unit 15 performs reallocation of time slots. As a result, as illustrated in the upper-right part and the lower-right part of FIG. 15, logical path 41 is reallocated to time slots 1 to 5, logical path #2 is reallocated to time slots 8 to 10, logical path #3 is reallocated to times slots 13 to 19 and 35 to 37, logical path #4 is reallocated to time slots 38 to 40, and logical path #5 is reallocated to time slots 31, 32, and 41 to 48.

FIG. 15 illustrates an example of the time slot allocating process and a time slot allocating process of sequentially allocating time slots in an increasing order of time slot IDs or the like except for an area in which a client signal cannot be accommodated among logical paths #1 to #5 may be performed.

In the above-mentioned embodiment, when abnormality occurs in an optical wavelength, the transmission frame multiplexing processing control unit 15 performs a reallocation process, but a reallocation process based on an abnormality pattern of all optical wavelengths may be performed in advance. When abnormality occurs actually in an optical wavelength, the transmission frame multiplexing processing control unit 15 transmits information of allocation of each logical path to time slots, which is calculated for the abnormality pattern based on the occurred abnormality to the transmission frame multiplexing processing unit 12 and the transmission frame demultiplexing processing control unit 25.

As described above, the transmission-side framer constituting the optical channel transmission system allocates a logical path to time slots of an optical channel depending on the band of the logical path. Each time slot corresponding to any one of optical wavelengths of a plurality of optical subcarriers which are used for multicarrier transmission. The transmission-side framer divides a client signal received via the logical path into the time slots allocated to the logical path and transmits the divided client signals to the reception-side framer by the plurality of optical subcarriers using the optical wavelengths of the time slots.

When an optical wavelength is abnormal and is unavailable, the transmission-side framer detects time slots affected by the abnormality and generates an abnormal time slot list which is a list of the detected time slots. The transmission-side framer generates an abnormal logical path ID list which is a list of logical paths to which the time slots included in the abnormal time slot list are allocated and generates an abnormal logical path normal time slot ID list which is a list of time slots not having abnormality among the time slots to which the logical paths included in the abnormal logical path ID list are allocated. The transmission-side framer calculates an effective band which is a transmission band allocated to the time slots not having abnormality in the transmission band of a logical path and performs (1) for each logical path included in the abnormal logical path ID list. The transmission-side framer may perform (2).

(1) A band of a logical path included in an abnormal logical path ID list is narrowed to the effective band of the logical path to reconfigure the logical path and the logical path is reallocated to time slots included in the abnormal logical path normal time slot ID list.

(2) In the process of narrowing the transmission band of the logical path included in the abnormal logical path ID list in (1), backpressure is performed on the device of a transmission destination of the logical path.

The transmission-side framer may perform (3).

(3) In the process of narrowing the transmission band of the logical path included in the abnormal logical path ID list in (1), first, the transmission band of a logical path having a lower priority than the logical path included in the abnormal logical path ID list is preferentially narrowed.

In the related art, in an optical transmission device that divides an optical channel into a plurality of time slots and divides and transmits the optical channel, in which a plurality of logical paths are multiplexed by allocating a logical path to the time slots depending on the band of the logical path, into a plurality of optical wavelengths or physical ports, when a certain optical wavelength or physical port for transmitting the optical channel is abnormal, the logical path traffic passing through the abnormal optical wavelength or physical port is cut off. At this time, the logical path traffic passing through the abnormal optical wavelength or physical port including traffic passing through optical wavelengths or physical ports not having abnormality is cut off. For example, when a logical path is allocated to time slots as illustrated in the lower-left part of FIG. 13 and abnormality occurs in optical wavelength #3, a client signal of logical path #3 using optical wavelength #3 is cut off.

According to the above-mentioned embodiment, when abnormality occurs in a certain optical wavelength or physical port transmitting an optical channel, a framer in an optical transmission device dynamically performs a process of narrowing a transmission path permitted for a logical path and changing time slots allocated to the logical path depending on the narrowed transmission band to avoid using the time slots corresponding to an optical wavelength or physical port which are unavailable due to occurrence of abnormality. Accordingly, a logical path is dynamically reconfigured to transmit traffic as much as possible using optical wavelengths or physical ports not having abnormality so as to reduce an influence of abnormality.

The transmission frame transmission abnormality monitoring unit 14, the transmission frame multiplexing processing control unit 15, the transmission frame reception abnormality monitoring unit 24, and the transmission frame demultiplexing processing control unit 25 may be embodied by a computer. In this case, the functions may be embodied by recording a program for realizing the functions on a computer-readable recording medium and causing the computer system to read and execute the program recorded on the recording medium. The "computer system" mentioned herein includes an operating system (OS) or hardware such as peripherals. Examples of the "computer-readable recording medium" include a portable medium such as a flexible disk, a magneto-optical disk, a ROM, or a CD-ROM and a storage device such as a hard disk built in the computer system. The "computer-readable recording medium" may include a medium that dynamically holds a program for a short time like a communication line when a program is transmitted via a network such as the Internet or a communication line such as a telephone circuit and a medium that holds a program for a predetermined time like a volatile memory in a computer system serving as a server or a client in that case. The program may serve to realize a part of the above-mentioned functions, or may serve to realize the above-mentioned functions in combination with another program stored in advance in the computer system.

While embodiments of the present invention have been described above in detail with reference to the drawings, the specific configuration thereof is not limited to the above-mentioned embodiments, but includes designs and the like without departing from the gist of the present invention.

INDUSTRIAL APPLICABILITY

The present invention can be applied to large-capacity optical transmission.

REFERENCE SYMBOLS

1 Optical transmission device
2 Optical transmission device
3 Transmission line
10 Transmission unit
20 Reception unit
11-1 to 11-4 Client signal receiving unit
12 Transmission frame multiplexing processing unit
13 Transmission frame transmitting unit
14 Transmission frame transmission abnormality monitoring unit
15 Transmission frame multiplexing processing control
21 Transmission frame receiving unit
22 Transmission frame demultiplexing processing unit
23-1 to 23-4 Client signal transmitting unit
24 Transmission frame reception abnormality monitoring unit
25 Transmission frame demultiplexing processing control unit
51 Time slot allocation management table storage unit
52 Abnormality information receiving unit
53 List generating unit
54 Time slot allocating unit
55 Allocation information transmitting unit
56 Band limiting instructing unit
110 Transmission processing unit
120 Client signal receiving unit
121 Reception unit
122 Mapping unit
123 OH processing unit
130 Multiplexing processing unit
131 Multiplexing unit
132 Framing unit
140 Line-side transmission processing unit
141 Interleaving unit
142-1, 142-2, 142-3, 142-4 OH processing unit
143-1, 143-2, 143-3, 143-4 Multi-lane transmission unit
150 Reception processing unit
160 Line-side reception processing unit
161-1, 161-2, 161-3, 161-4 Multi-lane reception unit
162-1, 162-2, 162-3, 162-4 OH processing unit
163 Deinterleaving unit
170 Separation processing unit
171 Deframing unit
172 Demultiplexing unit
180 Client signal transmitting unit
181 OH processing unit
182 Demapping unit
183 Transmission unit
210 ODU-SW
220 Transmitter
230 Receiver
800 OTN framer

The invention claimed is:

1. A framer in a transmission device that allocates time slots of an optical channel to a logical path, divides client signals received via the logical path to the time slots allocated to the logical path, and transmits the client signals by a plurality of optical subcarriers using optical wavelengths correlated with the time slots, the framer comprising at least one processor programmed to:

when an optical wavelength of the optical wavelengths is abnormal and is unavailable, detect a time slot affected by the abnormality as an abnormal time slot;

determine an abnormal logical path which is the logical path to which the abnormal time slot is allocated;

determine a normal time slot which is a time slot not having abnormality among the time slots included in the abnormal logical path;

calculate an effective band which is a transmission band allocated to the normal time slot in a transmission band of the abnormal logical path;

reconfigure the abnormal logical path by narrowing the transmission band of the abnormal logical path to the effective band; and reallocate the abnormal logical path to the normal time slot included in the abnormal logical path.

2. The framer according to claim 1, wherein the processor is further programmed to instruct a device transmitting the client signals using the abnormal logical path of which the transmission band is reduced to reduce an available transmission band.

3. The framer according to claim 1, wherein the processor is further programmed to reduce the transmission band of the logical path allocated to the time slots corresponding to the unavailable optical wavelengths.

4. The framer according to claim 1, wherein the processor is further programmed to reduce the transmission band of the logical path having a lower priority than the logical path allocated to the time slots corresponding to the unavailable optical wavelengths.

5. A framing method which is performed by a framer in a transmission device that allocates time slots of an optical channel to a logical path, divides client signals received via the logical path to the time slots allocated to the logical path, and transmits the client signals by a plurality of optical subcarriers using optical wavelengths correlated with the time slots, the framing method comprising:

when an optical wavelength of the optical wavelengths is abnormal and is unavailable, detecting a time slot affected by the abnormality as an abnormal time slot;

determining an abnormal logical path which is the logical path to which the abnormal time slot is allocated;

determining a normal time slot which is a time slot not having abnormality among the time slots included in the abnormal logical path;

calculating an effective band which is a transmission band allocated to the normal time slot in a transmission band of the abnormal logical path;

reconfiguring the abnormal logical path by narrowing the transmission band of the abnormal logical path to the effective band; and reallocating the abnormal logical path to the normal time slot included in the abnormal logical path.

6. The framing method according to claim 5, further comprising:

instructing a device transmitting the client signals using the abnormal logical path of which the transmission band is reduced to reduce an available transmission band.

7. The framing method according to claim 5, further comprising:

reducing the transmission band of the logical path allocated to the time slots corresponding to the unavailable optical wavelengths.

8. The framing method according to claim 5, further comprising:

reducing the transmission band of the logical path having a lower priority than the logical path allocated to the time slots corresponding to the unavailable optical wavelengths.

* * * * *